US010620076B2

(12) United States Patent
Knoell et al.

(10) Patent No.: US 10,620,076 B2
(45) Date of Patent: Apr. 14, 2020

(54) WIRELESS PRESSURE TESTING SYSTEM AND METHODS OF USE

(71) Applicant: A & E Incorporated, Racine, WI (US)

(72) Inventors: Maximilian Knoell, Racine, WI (US); Timothy J. Alho, Pleasant Prairie, WI (US); Bruce Engel, Milwaukee, WI (US); Jason Horner, Burlington, WI (US); Myeong Geun Cheon, Incheon (KR); Jin Kook Jeong, Gyeonggi-Do (KR)

(73) Assignee: A & E INCORPORATED, Racine, WI (US)

( * ) Notice: Subject to any disclaimer, the term of this patent is extended or adjusted under 35 U.S.C. 154(b) by 272 days.

(21) Appl. No.: 15/832,357

(22) Filed: Dec. 5, 2017

(65) Prior Publication Data

US 2018/0156685 A1 Jun. 7, 2018

Related U.S. Application Data

(60) Provisional application No. 62/431,237, filed on Dec. 7, 2016.

(51) Int. Cl.
*G01L 23/24* (2006.01)
*G01L 19/08* (2006.01)
(Continued)

(52) U.S. Cl.
CPC ............ *G01L 23/24* (2013.01); *G01L 19/083* (2013.01); *G07C 5/08* (2013.01); *G01L 19/143* (2013.01); *G07C 2205/02* (2013.01); *H04W 4/80* (2018.02)

(58) Field of Classification Search
CPC ..... G01L 23/24; G01L 19/083; G01L 19/143; G07C 5/08
See application file for complete search history.

(56) References Cited

U.S. PATENT DOCUMENTS

| 5,663,493 A | 9/1997 | Gerbert et al. |
| D390,140 S | 2/1998 | Germanton |

(Continued)

FOREIGN PATENT DOCUMENTS

| CA | 2935592 A1 | 7/2015 |
| EP | 0685723 A2 | 12/1995 |
| WO | WO2015/109278 A1 | 7/2015 |

OTHER PUBLICATIONS

European Search Report pertaining to EP17206047, dated Mar. 21, 2018, 11 pages.

(Continued)

*Primary Examiner* — Bryan Bui
(74) *Attorney, Agent, or Firm* — Ryan, Kromholz & Manion, S.C.

(57) ABSTRACT

A pressure measuring device/system that is capable of measuring the pressures of multiple systems in an automobile, including cylinder pressure, fuel pressure, transmission oil pressure, and engine oil pressure, and is capable of displaying and/or recording the measured pressure values remote from the device taking the measured remote pressures. The pressure measuring system has a remote interface and a sensor configured to communicate wirelessly with each other. The interface may be configured to be included within the device purpose built for displaying and interacting with the pressure values measured by the sensor. Additionally or alternatively, the interface may be configured to be downloaded as a mobile application "app" on a smartphone or other similar device.

5 Claims, 2 Drawing Sheets

(51) Int. Cl.
  *G07C 5/08*   (2006.01)
  *G01L 19/14*  (2006.01)
  *H04W 4/80*   (2018.01)

(56) References Cited

U.S. PATENT DOCUMENTS

| | | |
|---|---|---|
| 5,875,413 A | 2/1999 | Vinci |
| 5,884,202 A | 3/1999 | Arjomand |
| 6,029,508 A | 2/2000 | Schoenbeck et al. |
| 6,227,043 B1 | 5/2001 | Schoenbeck et al. |
| 6,701,232 B2 | 3/2004 | Yamaki |
| 6,968,733 B2 | 11/2005 | Andreasen et al. |
| D648,236 S | 11/2011 | Rodrig |
| D671,023 S | 11/2012 | Stowers |
| D678,094 S | 3/2013 | Rodrig |
| 8,428,912 B2 | 4/2013 | Neuwirth |
| D683,643 S | 6/2013 | Stowers |
| D700,089 S | 2/2014 | Sundheim |
| 9,188,505 B2 | 11/2015 | Martin |
| 2002/0134150 A1 | 9/2002 | Shih |
| 2011/0029146 A1* | 2/2011 | Muller ............ B60L 53/30 700/293 |
| 2012/0109544 A1 | 5/2012 | Fish et al. |
| 2014/0350752 A1 | 11/2014 | Gelinske |
| 2016/0209095 A1* | 7/2016 | Parker ............ F25B 49/00 |

OTHER PUBLICATIONS

Parker Hannifin Corporation, Sporlan Smart Service Tool Kit brochure, dated 2014, 4 pages.
Webpage https://www.amazon.com/STEELMAN-97202-Wireless-ChassisEAR-Diagnostic/dp/B00123J79O/ref=sr_1_1?s=automotive&ie=UTF8&qid=1517330029&sr=1-1, dated Jan. 9, 2018, 1 page.

* cited by examiner

WIRELESS PRESSURE TESTING SYSTEM AND METHODS OF USE

RELATED APPLICATION

This application claims the benefit of U.S. Provisional Patent Application Ser. No. 62/431,237, filed 7 Dec. 2016.

BACKGROUND OF THE INVENTION

Pressure measuring tools, particularly pressure measuring tools for automotive use, are known in the art. Generally, individual pressure measuring devices are needed for measuring each of cylinder pressure, fuel pressure, transmission oil pressure, and engine oil pressure. Additionally, each of these pressure measuring devices are integral, inter-connected devices. Accordingly, the art of pressure measuring devices would benefit from a pressure measuring device/system that is capable of measuring the pressures of multiple systems in an automobile (or in other environments, such as an industrial or manufacturing environment) and one that is capable of displaying and/or recording the measured pressure values in a device remote from the situs where the pressure values are desired to be read.

SUMMARY OF THE INVENTION

The present invention relates to a pressure measuring device/system that is capable of measuring the pressures of multiple systems in an automobile, including cylinder pressure, fuel pressure, transmission oil pressure, and engine oil pressure, and is capable of displaying and/or recording the measured pressure values remote from the device measuring the pressure values. The pressure measuring system comprises an interface such as a smartphone and a pressure measuring sensor configured to communicate wirelessly with each other. The interface may be configured to be included within a pressure measuring sensor purpose built for displaying and interacting with the readings of the remote sensor. Additionally or alternatively, the interface may be configured to be downloaded as a mobile application "app" on a smartphone or other similar device.

By using the systems and methods of the present invention, an advantage is that a technician can employ a remote sensor without requiring hard wiring. Data signals can be sent to a handheld wireless device, without requiring a solid connection between a sensor and a data recorder etc. In this manner, a technician can record data from real time operating conditions as a vehicle is driven down the road. This is advantageous because oftentimes operating conditions cannot be duplicated in a bay of a service center. A sensor is deployed, and using couplings to an engine, the engine can be monitored on the fly.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

The present invention is directed to vehicle monitoring system, which can for instance be used to measure pressures in automotive/transportation applications (e.g., cylinder pressure, fuel pressure, transmission fluid pressure, and engine oil pressure) and methods for using the same.

Figure 1:
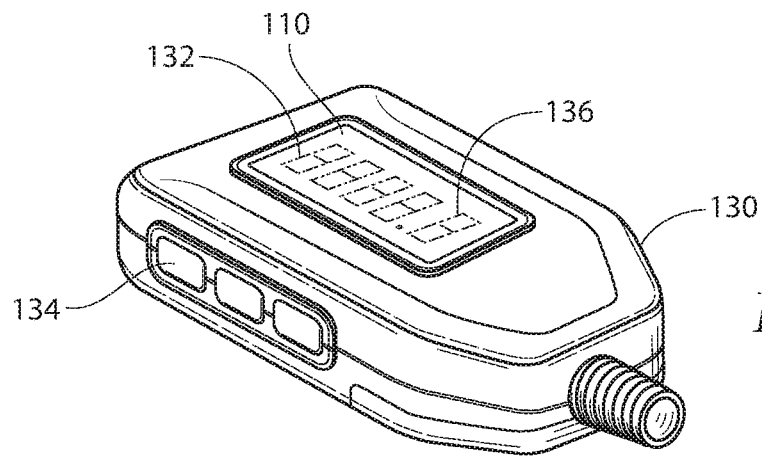
FIG. 1 is a perspective view of a pressure measuring sensor according to the present invention.
Figure 2:
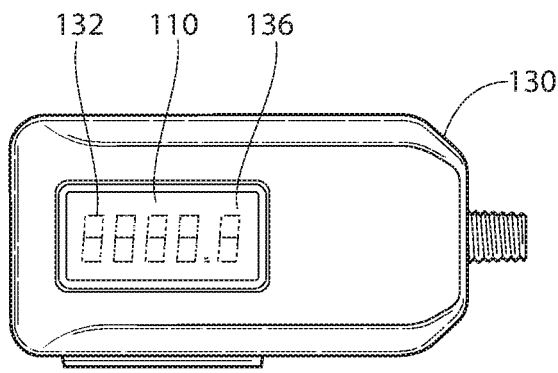
FIG. 2 is a to plan view of the pressure measuring sensor shown in FIG. 1.
Figure 3:
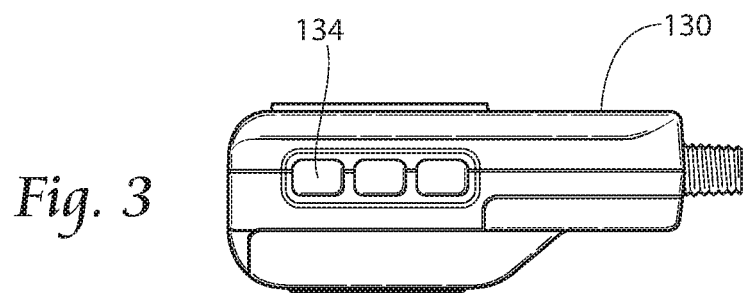
FIG. 3 is a side elevation view of the pressure measuring sensor shown in FIG. 1.

Referring now to FIG. 1, a user interface 110 is preferably provided within a device such as pressure measuring sensor 130 which preferably has a digital display 132. The device 130 may be a device constructed to be primarily used to house the interface 110 and pw communicate with the at least one sensor 120 (shown in FIG. 5), having at least one of a physical button 134 and a virtual button 136 (virtual buttons used, for instance, in a touchscreen environment) provided on the display 132. The at least one physical button 134 and/or virtual button 136 may be configured to turn the interface 110 on and off (i.e., a power button), to actively synchronize the at least one remote sensor 120 and the smartphone 242 (i.e., a "sync" button), to clear the current readings (i.e., a "zero" button), and/or to select the units in which the readings will be supplied (i.e., a "units" button). Smartphone 242 can also duplicate the readout of interface 110, if desired.

Additionally or alternatively, the device 130 carries a magnet 138. The magnet 138 is configured to retain the device 130 in the engine compartment (FIG. 6) while readings are taken (e.g., pressures are being measured), because it is contemplated that some measuring will be performed while the vehicle (the interior of which is shown in FIG. 6) is being driven.

Figure 6:
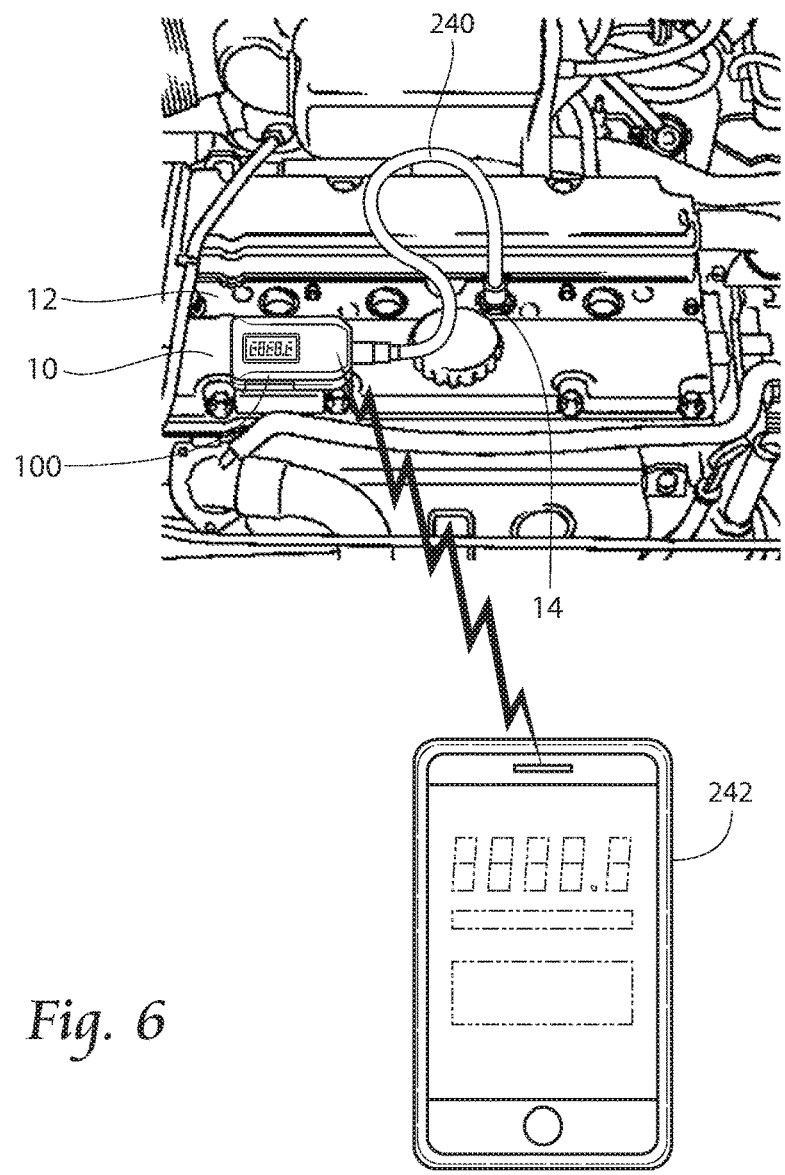
FIG. 6 illustrates a system comprising the pressure measuring sensor coupled to and monitoring an engine, and communicating with a remote interface device.

It is also contemplated that the interface 110 be downloadable as an "Application" or "App" on a Smartphone 242 (FIG. 6). Referring now to the app itself, with the power on, there is a sync button on the red unit, which then engages the phone. The phone confirms the connection.

Logs are taken, in which recorded information as readings are taken, is saved and charted. Several logs can be recorded. From a list of sequential log, we each log can be opened and analyzed by a technician, and notes can be added to each log. From the log list, the logs can be exported from the app, for instance by and email in formats such as jpg, png, csv, and provided with a summary.

Referring to buttons 134, in a preferred embodiment these can be for: 1) Units—to switch measurement units; 2) Mode—to switch from positive to negative (vacuum) pressure readings; 3) Cylinder—to allow a user to select how many cylinders the engine has; for instance, in a four cylinder engine, all four cylinders could be contained in one log file. In an app, or on the unit as buttons 134 could also be a 4) Menu, to disconnect Bluetooth, or reconnect; 5) Settings, in which the unit can be set to continuous record, logging interval (how many minutes and seconds each sample should be), sound alerts, vibration alerts, and refresh rate between sampling intervals. A Record button can be set to begin a test. A Zero button can zero out the pressure reading. A Graph button can bring up a test result graphical reading in real time. This data can ultimately be saved as the log.

The interface 110 and the at least one remote sensor 120, 130 are preferably configured to wirelessly interact via BLUETOOTH®, Wi-Fi, ZIGBEE®, with smartphone 242 and/or any other wireless technology now known or later developed.

Figure 5:
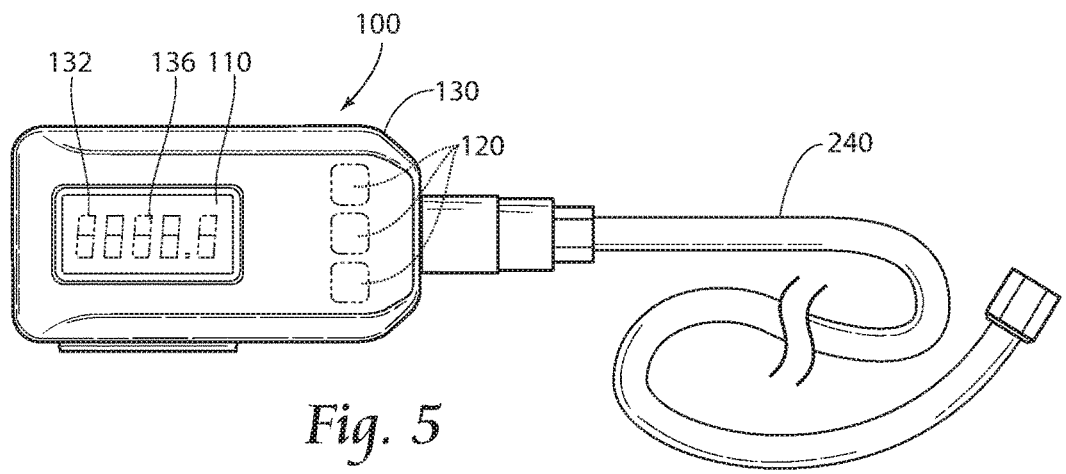
FIG. 5 is a top view of a pressure measuring sensor of the present invention, coupled to a representative hose assembly and coupling.

As shown in FIGS. 5 and 6, the system 100 preferably comprises a user interface 110 and at least one remote pressure measuring sensor 120 carried by the device 130.

The sensor 120 is preferably contained within unit 100. This sensor is preferably fuel pressure, compression and/or vacuum, but other sensors can be carried by the unit 100 such as temperature, humidity or electrical readouts. Measurement outputs can be in psi, in/Hg, kpA, mm/hg, or bars, for instance. Unit 100 carries couplings and hose 240, for attachment to an area of inquiry in the vehicle. For instance, a fuel line, spark plug hole, or anywhere else in the vehicle of interest can receive the couplings and hose 240. A plurality of couplings 240 can be provided; for instance, a standard fuel setup with pressure bleed off, which can work with different fuel adaptors: Fuel injection; inline or direct port adaptors; or a Universal interchange connector. For compression, compression adaptors can be used, such as hose style, DOHC cam, or units available from Lang Tools with SKU numbers 73106, 73109, 73110 for example, each of which is incorporated by reference.

Figure 4:
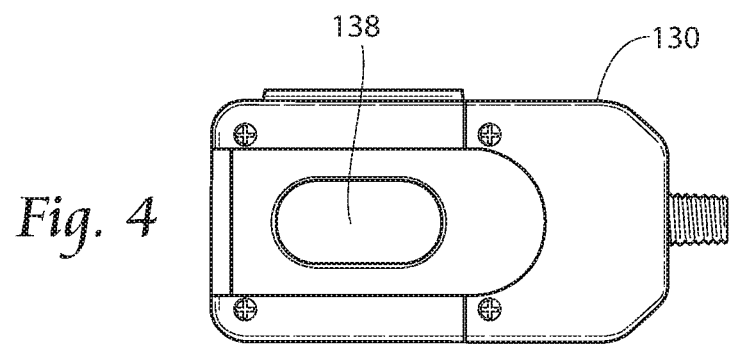
FIG. 4 is a bottom plan view of the pressure measuring sensor shown in FIG. 1.

Because the unit 100 can be carried (for instance magnetically by magnet 138 as shown in FIG. 4) inside the vehicle as shown in FIG. 6, the unit can transmit data to unit 242, 110 (e.g., a smart phone) while the vehicle is running and/or underway. In this manner, a dual readout 132 of the unit 100 is simultaneously displayed at unit 242, and can be logged or monitored. One advantage of the present invention is the ability to remotely read measurements from an interior of the vehicle engine compartment, and record measurements on an additional device, all preferably while the vehicle is underway.

The pressure measurements taken by the at least one remote sensor 130, 120 are in an exemplary embodiment, taken in one second intervals; however, smaller or larger intervals are also. The pressure measurements taken by the at least one sensor 120 are preferably provided on the display 132 of the device 130.

Synchronization of the remote sensor 120 to the interface 110 preferably occurs at the same rate the remote sensor 120 measures the pressures and substantially simultaneously.

FIGS. 5 and 6 show a remote sensor 120 used for measuring cylinder pressure, for example. A coupling system 240, such as a hose, couples the unit 130 with the portion of the vehicle to be analyzed, such as in FIG. 6. The sensor 120 is coupled, by way of coupling system 240, for example a spark plug hole 14 in a cylinder head 12 of an engine 10. The following example of the system 100 in use is provided as it pertains to a method for measuring cylinder pressure. It is preferable that the fuel delivery system is disengaged and the coil (not shown) is disconnected. Remove all spark plugs (not shown) from their respective spark plug hole 14 in the cylinder head 12 and couple the remote sensor 120 (via coupling system 240) with the spark plug hole 14. Sensors 120, 130 are then synchronized with the smart phone 242. The engine 10 is turned over and the pressure transducer 120 measures the pressure formed within the engine cylinder (not shown) for at least a complete intake-compression-ignition-exhaust cycle, preferably more than one complete cycle. The pressure measurements are transmitted to the interface 242 wirelessly. It is contemplated that the cylinder pressure for the at least one intake-compression-ignition-exhaust cycle may be measured, transmitted, viewed on the display 132, and recorded for each cylinder. The measured pressure values for each cylinder are preferably saved for reference by an application on the smart phone 242.

Sensor 120 carried by unit 130 according to the present invention can be used for measuring fuel pressure for instance. The remote sensor 120 may be equipped to interface with a fuel system via a Schrader valve test port (not shown).

An additional remote sensor 130 can be used for measuring transmission oil pressure, for measuring engine oil pressure, compression, vacuum and the like.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined the claims.

We claim:

1. A wireless testing system for measuring target operational parameters of a motor vehicle, the wireless testing system comprising:
    a housing, and a coupling between said housing and said motor vehicle;
    a sensor carried by said housing;
    a communicative coupling carded by said housing for coupling the housing with the portion of the motor vehicle to be analyzed to allow said sensor to measure a targeted operational parameter of said motor vehicle;
    a remote user interface wirelessly coupled to said sensor;
    a local user interface carded by said housing and coupled to said sensor;
    a control panel carried by said housing, said control panel operatively coupled with said sensor, said sensor sensing a signal from said motor vehicle comprising at east one of cylinder pressure, fuel pressure, transmission oil pressure, and engine oil pressure;
    said remote user interface receiving said signal while said motor vehicle is in moving operation.

2. A wireless testing system according to claim 1, said a coupling between said housing and said motor vehicle comprising a magnetic coupling.

3. A wireless testing system according to claim 1, said remote user interface comprising a mobile phone.

4. A wireless testing system according to claim 1, said local user interface comprising a readout carried by said housing, and a plurality of controls comprising switches for varying at least one of settings, units, modes, and cylinders.

5. A method of measuring target operational parameters of a motor vehicle, method comprising:
    providing a sensor sensing a signal from said motor vehicle comprising at least one of cylinder pressure, fuel pressure, transmission oil pressure, and engine oil pressure;
    coupling said sensor to an engine compartment of said motor vehicle;
    transmitting readings wirelessly from said sensor to a remote user interface spaced apart from said sensor in an interior region of said motor vehicle, physically separate from said engine compartment of said motor vehicle;

logging said readings with said remote user interface while said motor vehicle is in moving operation.

\* \* \* \* \*